(12) United States Patent
Wang et al.

(10) Patent No.: US 10,642,054 B2
(45) Date of Patent: May 5, 2020

(54) THREE-DIMENSIONAL DISPLAY DEVICE

(71) Applicants: BOE Technology Group Co., Ltd., Beijing (CN); Beijing BOE Display Technology Co., Ltd., Beijing (CN)

(72) Inventors: Yanfeng Wang, Beijing (CN); Yuanxin Du, Beijing (CN); Zhenhua LV, Beijing (CN); Zhidong Wang, Beijing (CN); Xiaoling Xu, Beijing (CN); Hongshu Zhang, Beijing (CN); Weipin Hu, Beijing (CN); Congcong Wei, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 95 days.

(21) Appl. No.: 15/766,597

(22) PCT Filed: Oct. 11, 2017

(86) PCT No.: PCT/CN2017/105736
§ 371 (c)(1),
(2) Date: Apr. 6, 2018

(87) PCT Pub. No.: WO2018/171170
PCT Pub. Date: Sep. 27, 2018

(65) Prior Publication Data
US 2019/0079306 A1    Mar. 14, 2019

(30) Foreign Application Priority Data
Mar. 24, 2017    (CN) .......................... 2017 1 0184001

(51) Int. Cl.
*G02B 27/22*    (2018.01)
*G02F 1/155*    (2006.01)
(Continued)

(52) U.S. Cl.
CPC ........... *G02B 27/2214* (2013.01); *G02F 1/13* (2013.01); *G02F 1/155* (2013.01); *G09F 19/12* (2013.01); *H04N 13/31* (2018.05); *G09F 9/33* (2013.01)

(58) Field of Classification Search
CPC ....... G02B 27/2214; G02F 1/155; G02F 1/13; H04N 13/31; G09F 19/12; G09F 9/33
(Continued)

(56) References Cited

U.S. PATENT DOCUMENTS 5,945,965 A * 8/1999 Inoguchi ............ G02B 27/2214
345/6
2012/0105497 A1    5/2012 Lu et al.
(Continued)

FOREIGN PATENT DOCUMENTS

| CN | 202453582 U | 9/2012 |
| CN | 102830496 A | 12/2012 |

(Continued)

OTHER PUBLICATIONS

Corresponding Chinese Application 201710184001.X Office Action dated Aug. 15, 2018.
(Continued)

Primary Examiner — Charles S Chang
(74) Attorney, Agent, or Firm — Arent Fox LLP; Michael Fainberg

(57) ABSTRACT

There is disclosed a three-dimensional display device including: a micro LED display panel, a light control component arranged at a light-emitting side of the micro LED display panel, and a control component electrically connected with the micro LED display panel and the light control component respectively; where the control component is configured to control the micro LED display panel to display, and to control the light control component to
(Continued)

generate a parallax barrier matching with the micro LED display panel, in a three-dimensional display mode. The control component controls the light control component to generate the parallax barrier matching with the micro LED display panel, while controlling the micro LED display panel to display, and when light rays emitted by the micro LED display panel pass through the parallax barrier, a three-dimensional image can be displayed, so that a three-dimensional display can be achieved on the micro LED display panel.

16 Claims, 5 Drawing Sheets

(51) Int. Cl.
*H04N 13/31* (2018.01)
*G02F 1/13* (2006.01)
*G09F 19/12* (2006.01)
*G09F 9/33* (2006.01)

(58) Field of Classification Search
USPC .......................................................... 349/15
See application file for complete search history.

(56) References Cited

U.S. PATENT DOCUMENTS

| | | | |
|---|---|---|---|
| 2014/0035800 A1* | 2/2014 | Lee | H04N 13/315 345/96 |
| 2014/0055336 A1 | 2/2014 | Wu et al. | |
| 2014/0063602 A1 | 3/2014 | Wu et al. | |
| 2015/0268479 A1* | 9/2015 | Woodgate | G02B 27/2214 349/15 |
| 2016/0274370 A1 | 9/2016 | Wu | |
| 2017/0026637 A1 | 1/2017 | Lu et al. | |
| 2017/0219836 A1* | 8/2017 | Hyodo | G02B 27/2214 |
| 2018/0107008 A1 | 4/2018 | Lu et al. | |
| 2018/0196272 A1 | 7/2018 | Chen | |

FOREIGN PATENT DOCUMENTS

| | | |
|---|---|---|
| CN | 202837755 U | 3/2013 |
| CN | 103018940 A | 4/2013 |
| CN | 103424924 A | 12/2013 |
| CN | 103499883 A | 1/2014 |
| CN | 103995403 A | 8/2014 |
| CN | 104950462 A | 9/2015 |
| CN | 105467604 A | 4/2016 |
| CN | 105929552 A | 9/2016 |
| CN | 106707533 A | 5/2017 |
| TW | 201217834 A1 | 5/2012 |

OTHER PUBLICATIONS

International Search Report for PCT/CN2017/105739 dated Dec. 28, 2017.
Corresponding Chinese Application 201710184001X Office Action dated Aug. 2, 2019.

\* cited by examiner

THREE-DIMENSIONAL DISPLAY DEVICE

This application is a National Stage of International Application No. PCT/CN2017/105736, filed Oct. 11, 2017, which claims priority to Chinese Patent Application No. 201710184001.X, filed Mar. 24, 2017, both of which are hereby incorporated by reference in their entireties.

TECHNICAL FIELD

The present application relates to the field of three-dimensional display technologies, and particularly to a three-dimensional display device.

BACKGROUND

A Liquid Crystal Display (LCD) has been widely applied to a TV set, a notebook computer, a mobile phone, a personal digital assistant, or other modern information devices due to its low weight, small thickness, low power consumption, easiness to drive, no harmful rays, and other advantages. However since the LCD display panel does not emit any light, it shall be coupled with an external light source to display, so that there is a large thickness of the LCD display device.

In order to cater to the development trend of the display panel becoming light-weighted, an Organic Light-Emitting Diode (OLED) display panel has emerged after the LCD display panel was made, and is characterized in self-luminescence, no backlight source to be required, a high contrast, a small thickness, a wide angle of view, a high response speed, applicable to a flexible panel, a wide range of operating temperature, a simple structure, a simple fabrication process, and other excellent characteristics.

As new generations of display panels are emerging, a new display technology, which is a micro Light-Emitting Diode (LED) display technology, has emerged in the market, where the micro LED is also an active light-emitting element, and a micro LED display panel is expected to be predominant in future display technologies due to its high response speed, wide range of operating temperature, high utilization ratio of a light source, long service lifetime, low cost, and other advantages over the OLED display panel.

SUMMARY

Embodiments of this disclosure provide a three-dimensional display device.

Embodiments of the disclosure provide a three-dimensional display device including: a micro LED display panel, a light control component arranged at a light-emitting side of the micro LED display panel, and a control component electrically connected with the micro LED display panel and the light control component respectively, wherein: the control component is configured to control the micro LED display panel to display, and to control the light control component to generate a parallax barrier matching with the micro LED display panel, in a three-dimensional display mode, wherein the parallax barrier includes light-shielding strips, and light-transmitting strips, which are arranged alternately.

Optionally in the three-dimensional display device above according to the embodiments of the disclosure, the control component is configured to control the micro LED display panel to display in a landscape mode or in a portrait mode, according to a detected relative positional relationship of a viewer to the micro LED display panel, and to control the light control component to generate a parallax barrier matching with the landscape mode or the portrait mode, in the three-dimensional display mode.

Optionally in the three-dimensional display device above according to the embodiments of the disclosure, the light control component includes: a first substrate and a second substrate arranged opposite to each other, an electrode structure arranged between the first substrate and the second substrate, and a light adjusting layer configured to generate the parallax barrier according to voltage variation of the electrode structure.

Optionally in the three-dimensional display device above according to the embodiments of the disclosure, a material of the light adjusting layer is a liquid crystal material or an electrochromic material.

Optionally in the three-dimensional display device above according to the embodiments of the disclosure, the electrode structure includes: a plurality of transverse strip-shaped electrodes, and a plurality of longitudinal strip-shaped electrodes, which are arranged on a side of the first substrate facing the second substrate, and which intersect in different planes with, and are insulated from each other, and a planar electrode arranged on a side of the second substrate facing the first substrate.

Optionally in the three-dimensional display device above according to the embodiments of the disclosure, the first substrate is located between the second substrate and the micro LED display panel; or the second substrate is located between the first substrate and the micro LED display panel.

Optionally in the three-dimensional display device above according to the embodiments of the disclosure, the light control component further includes an insulation layer arranged between respective transverse strip-shaped electrodes and respective longitudinal strip-shaped electrodes.

Optionally in the three-dimensional display device above according to the embodiments of the disclosure, the control component includes a capture element and a control element, wherein: the capture element is configured to determine a relative position of a line of sight of the viewer to the micro LED display panel, or to determine a gravity sensing direction of the three-dimensional display device; and the control element is configured to determine a three-dimensional display direction required of the three-dimensional display device according to the determined relative position of the line of sight of the viewer to the micro LED display panel, or the determined gravity sensing direction of the three-dimensional display device, and thereafter to control the micro LED display panel to display in the landscape mode or in the portrait mode, and to control the light control component to generate the parallax barrier matching with the landscape mode or the portrait mode.

Optionally in the three-dimensional display device above according to the embodiments of the disclosure, the capture element is a camera or a gravity sensor.

Optionally in the three-dimensional display device above according to the embodiments of the disclosure, each of the light-shielding strips and each of the light-transmitting strips in the parallax barrier correspond respectively to one column or one row of pixels in the micro LED display panel.

Optionally in the three-dimensional display device above according to the embodiments of the disclosure, a width of each of the light-shielding strips in the parallax barrier is the same as a width of each of the light-transmitting strips in the parallax barrier.

Optionally in the three-dimensional display device above according to the embodiments of the disclosure, the three-dimensional display device further includes a transparent glue layer arranged between the micro LED display panel and the light control component.

Optionally in the three-dimensional display device above according to the embodiments of the disclosure, a material of the light adjusting layer is a liquid crystal material, and the light control component further includes a plurality of transparent spacers arranged between the first substrate and the second substrate.

DETAILED DESCRIPTION OF THE EMBODIMENTS

Figure 1:
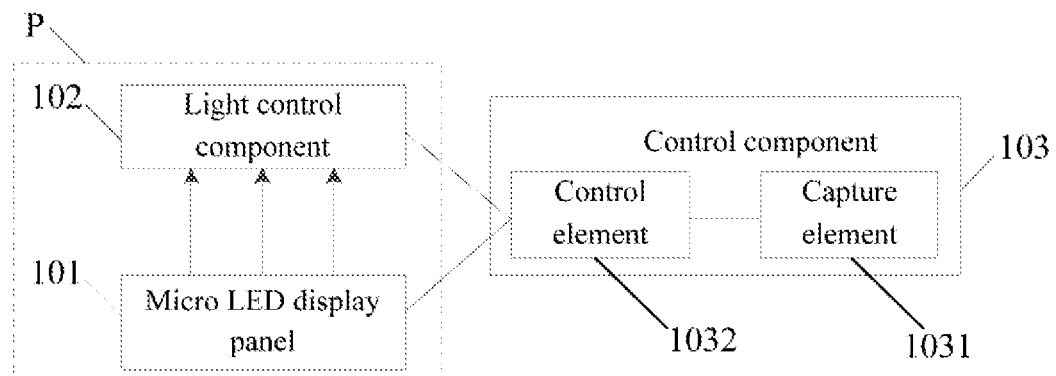
FIG. 1 is a schematic structural diagram of a three-dimensional display device according to embodiments of the disclosure.

Particular implementations of a three-dimensional display device according to embodiments of the disclosure will be described below in details with reference to the drawings.

The thicknesses, sizes, and shapes of respective layers in the drawings are not intended to reflect any real proportion of a display device, but only intended to illustrate the disclosure.

Figure 2:
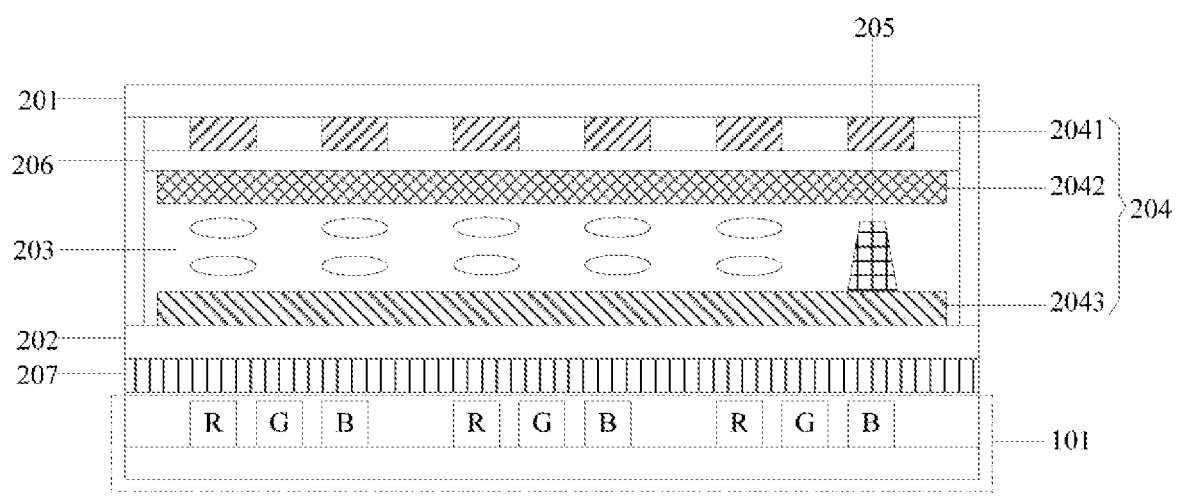
FIG. 2 is a schematic structural diagram of a P area in FIG. 1 in details.
Figure 3:
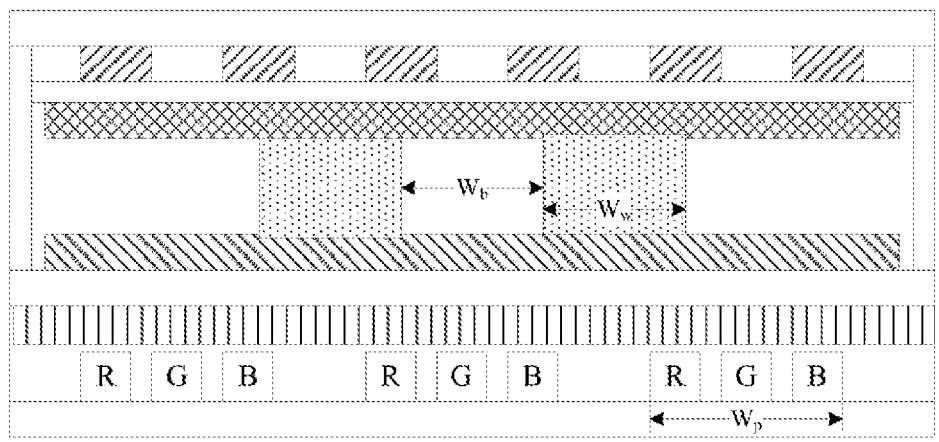
FIG. 3 is a schematic diagram of the three-dimensional display device according to the embodiments of the disclosure displaying in a landscape mode.

As illustrated in FIG. 1 to FIG. 3, a three-dimensional display device according to the embodiments of the disclosure includes: a micro LED display panel 101, a light control component 102 arranged at a light-emitting side of the micro LED display panel 101, and a control component 103 electrically connected with the micro LED display panel 101 and the light control component 102 respectively.

Where the control component 103 is configured to control the micro LED display panel 101 to display, and to control the light control component 102 to generate a parallax barrier matching with the micro LED display panel 101, in a three-dimensional display mode, where the parallax barrier includes light-shielding strips, and light-transmitting strips, which are arranged alternately.

In the three-dimensional display device according to the embodiments of the disclosure, the control component 103 can control the light control component 102 to generate the parallax barrier matching with the micro LED display panel 101, while controlling the micro LED display panel 101 to display, and when light rays emitted by the micro LED display panel 101 pass through the parallax barrier, a three-dimensional image can be displayed, so that a three-dimensional display can be achieved on the micro LED display panel 101.

Optionally in the three-dimensional display device above according to the embodiments of the disclosure, the control component 103 is configured to control the micro LED display panel 101 to display in a landscape mode or in a portrait mode, according to a detected relative positional relationship of a viewer to the micro LED display panel 101, and to control the light control component 102 to generate a parallax barrier matching with the landscape mode or the portrait mode, in the three-dimensional display mode, where the parallax barrier includes the light-shielding strips, and the light-transmitting strips, which are arranged alternately.

Since the control component 103 can control the micro LED display panel 101 to display in the landscape mode or in the portrait mode, according to the detected relative positional relationship of the viewer to the micro LED display panel 101, a two-dimension image can be displayed on the micro LED display panel 101 in a landscape direction or in a portrait direction. Furthermore the control component 103 can further control the light control component 102 to generate the parallax barrier matching with the landscape mode or the portrait mode, while controlling the micro LED display panel 101 to display in the landscape direction or in the portrait direction, and when light rays emitted by the micro LED display panel 101 pass through the parallax barrier, a three-dimensional image can be displayed in the landscape direction or in the portrait direction, so that a three-dimensional display can be achieved on the micro LED display panel 101 in different directions.

Particularly, taking the three-dimensional display above according to the embodiments of the disclosure as a mobile phone, for example, while the viewer is watching the mobile phone in the landscape mode, the control component 103 controls the micro LED display panel 101 to display in the landscape mode, according to the detected relative positional relationship of the viewer to the micro LED display panel 101, and also controls the light control component 102 to generate the parallax barrier matching with the landscape mode, so that a three-dimensional image is displayed in the landscape direction. Alike while the viewer is watching the mobile phone in the portrait mode, the control component 103 controls the micro LED display panel 101 to display in the portrait mode, according to the detected relative positional relationship of the viewer to the micro LED display panel 101, and also controls the light control component 102 to generate the parallax barrier matching with the portrait mode, so that a three-dimensional image is displayed in the portrait direction.

Optionally in the three-dimensional display device above according to the embodiments of the disclosure, the light control component 102 can be embodied in a number of implementations, and as illustrated in FIG. 2, for example, the light control component 102 can particularly include: a first substrate 201 and a second substrate 202 arranged opposite to each other, an electrode structure 204 arranged between the first substrate 201 and the second substrate 202, and a light adjusting layer 203 configured to generate the parallax barrier according to voltage variation of the electrode structure 204.

It shall be noted that in the three-dimensional display device above according to the embodiments of the disclosure, the first substrate 201 can be arranged between the second substrate 202 and the micro LED display panel 101; or as illustrated in FIG. 2, the second substrate 202 can alternatively be arranged between the first substrate 201 and the micro LED display panel 101, although the embodiments of the disclosure will not be limited thereto. For example, the second substrate 202 will be located between the first substrate 201 and the micro LED display panel 101 throughout the following description.

Optionally in order to enable the light rays to be transmitted through the light control component 102, materials of the first substrate 201 and the second substrate 202 can be glass, polymethyl-methacrylate, or another transparent material.

Optionally in the three-dimensional display device above according to the embodiments of the disclosure, a material of the light adjusting layer 203 can be a liquid crystal material or an electrochromic material. Of course, the light rays can alternatively be adjusted in other ways, although the embodiments of the disclosure will not be limited thereto.

Optionally, in order to enhance the robustness of the light adjusting layer 203 in the light control component 102 against a pressure, as illustrated in FIG. 2, the light control component 102 can further include a plurality of transparent spacers 205 arranged between the first substrate 201 and the second substrate 202.

Figure 4:
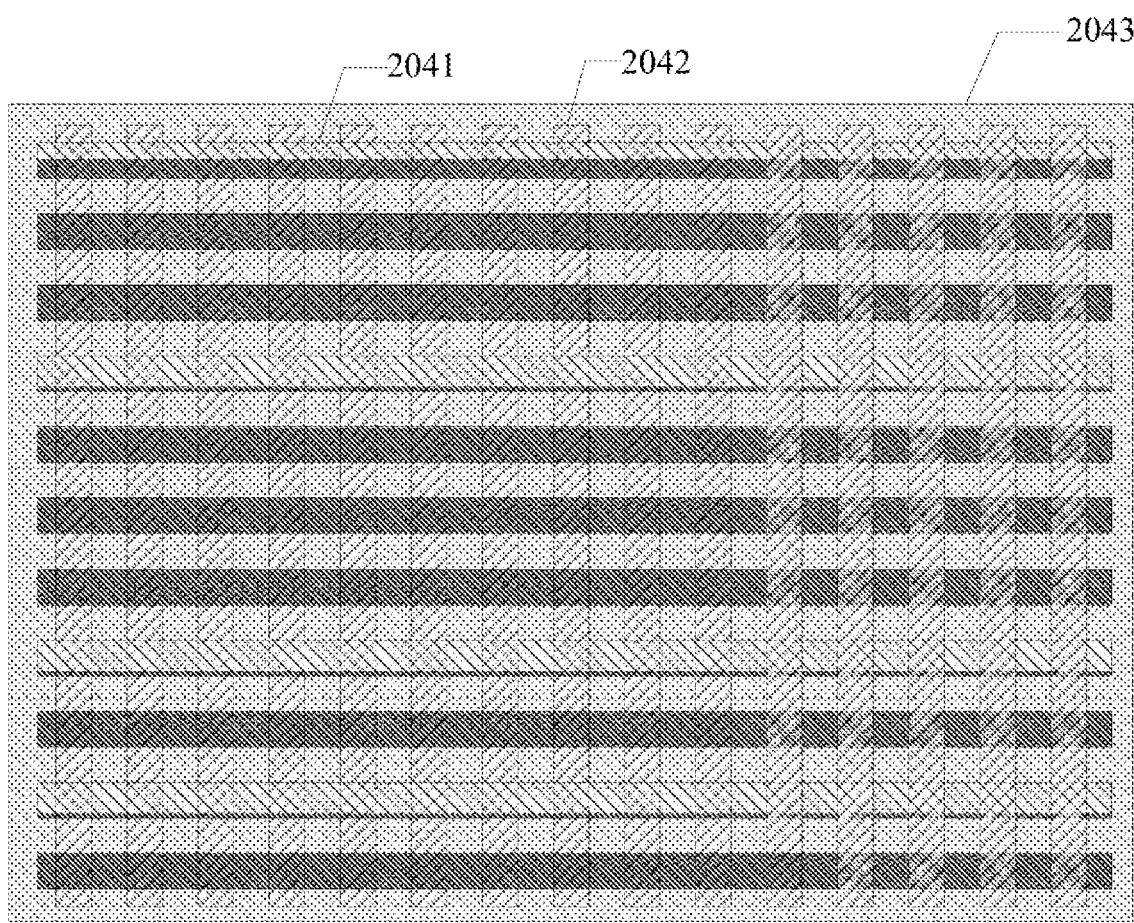
FIG. 4 is a schematic structural diagram of an electrode structure in the three-dimensional display device according to the embodiments of the disclosure in a top view.

Optionally in the three-dimensional display device above according to the embodiments of the disclosure, as illustrated in FIG. 2 and FIG. 4, the electrode structure 204 can particularly include: a plurality of transverse strip-shaped electrodes 2041, and a plurality of longitudinal strip-shaped electrodes 2042, which are arranged on a side of the first substrate 201 facing the second substrate 202, and which intersect in different planes with, and are insulated from each other, and a planar electrode 2043 arranged on a side of the second substrate 202 facing the first substrate 201. Of course, alternatively the planar electrode 2043 can be arranged on the side of the first substrate 201 facing the second substrate 202, and also the plurality of transverse strip-shaped electrodes 2041, and the plurality of longitudinal strip-shaped electrodes 2042, which intersect in different planes with, and are insulated from each other can be arranged on the side of the second substrate 202 facing the first substrate 201, although the embodiments of the disclosure will not be limited thereto.

Optionally, in order to enable the light rays to be transmitted through the light control component 102, materials of the transverse strip-shaped electrodes 2041, the longitudinal strip-shaped electrodes 2042, and the planar electrode 2043 can be indium tin oxide (ITO), indium zinc oxide (IZO), graphene, or another transparent conductive material, although the embodiments of the disclosure will not be limited thereto.

Optionally in order to enable the transverse strip-shaped electrodes 2041, and the longitudinal strip-shaped electrodes 2042 to have the same transmittance in the three-dimensional display device above according to the embodiments of the disclosure, a spacing between two adjacent transverse strip-shaped electrodes 2041 is the same as a spacing between two adjacent the longitudinal strip-shaped electrodes 2042, and particularly the spacing may be several micrometers.

Particularly the number of transverse strip-shaped electrodes 2041 and the number of longitudinal strip-shaped electrodes 2042 can be set reasonably according to a resolution required in the three-dimensional display, and the aspect ratio of the micro LED display panel 101. Furthermore a width of each of the transverse strip-shaped electrodes 2041 is approximate to a width of each of the longitudinal strip-shaped electrodes 2042, and their widths are approximately one hundred micrometers.

Optionally in order to enable respective transverse strip-shaped electrodes 2041 to be insulated from respective longitudinal strip-shaped electrodes 2042, in the three-dimensional display device above according to the embodiments of the disclosure, the light control component 102 can further include an insulation layer 206 arranged between the respective transverse strip-shaped electrodes 2041 and the respective longitudinal strip-shaped electrodes 2042, where the insulation layer 206 can be structured in a single layer, or can be structured in a plurality of layers, although the embodiments of the disclosure will not be limited thereto.

Optionally in order to improve the brightness of the three-dimensional display, in the three-dimensional display device above according to the embodiments of the disclosure, as illustrated in FIG. 2, the three-dimensional display device can further include a transparent glue layer 207 arranged between the micro LED display panel 101 and the light control component 102 to alleviate light emitted by the micro LED display panel 101 from being reflected by the light control component 102, so as to improve the brightness of the three-dimensional display, and the transparent glue layer 207 can be optical glue.

Particularly in the three-dimensional display device above according to the embodiments of the disclosure, as illustrated in FIG. 1, the control component 103 can include a capture element 1031 and a control element 1032, where: the capture element 1031 is configured to determine a relative position of a line of sight of the viewer to the micro LED display panel 101, or to determine a gravity sensing direction of the three-dimensional display device; and the control element 1032 is configured to determine a three-dimensional display direction required of the three-dimensional display device according to the determined relative position of the line of sight of the viewer to the micro LED display panel 101, or the determined gravity sensing direction of the three-dimensional display device, and thereafter to control the micro LED display panel 101 to display in the landscape mode or in the portrait mode, and also to control the light control component 102 to generate the parallax barrier matching with the landscape mode or the portrait mode.

Particularly in the three-dimensional display device above according to the embodiments of the disclosure, the capture element 1031 is a camera or a gravity sensor.

A detailed process of displaying on the three-dimensional display device according to the embodiments of the disclosure in the three-dimensional mode will be described with reference to FIG. 5A and FIG. 5B, where the capture element 1031 is a camera, for example.

The camera 30 determines the relative position of the line of sight of the viewer to the micro LED display panel 101.

The control element (not illustrated in FIG. 5A and FIG. 5B) determines the three-dimensional display direction required of the three-dimensional display device according to the determined relative position of the line of sight of the viewer to the micro LED display panel 101. And for example, the three-dimensional display direction required of the three-dimensional display device is determined as a horizontal direction X as illustrated in FIG. 5A, and as a vertical direction Y as illustrated in FIG. 5B.

Figure 5A:
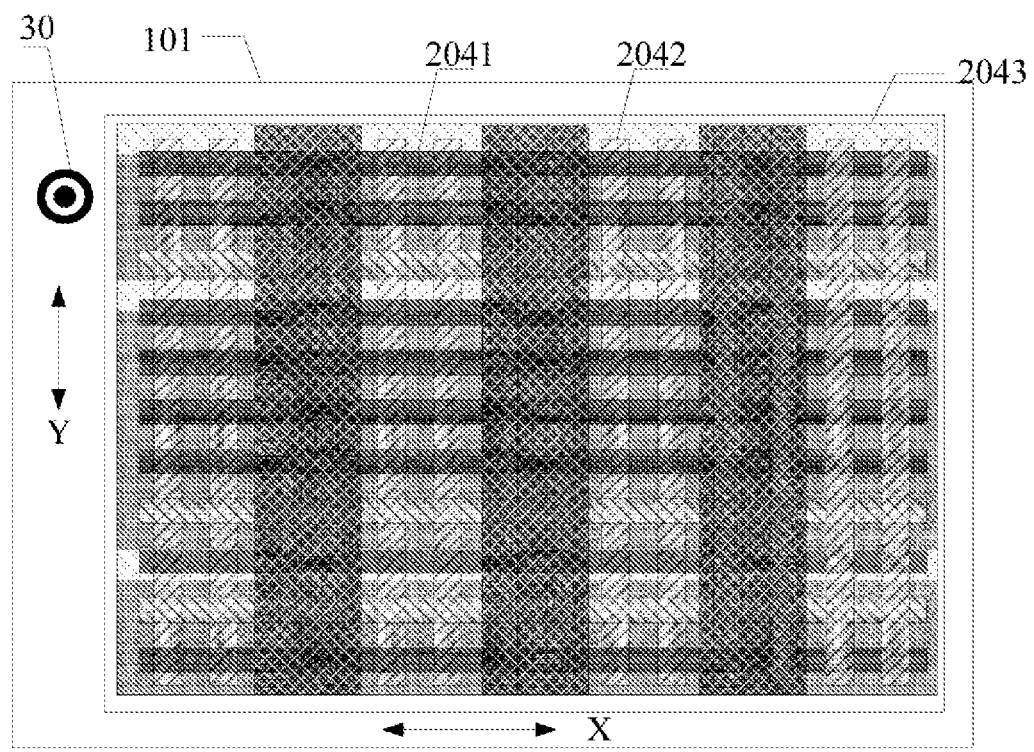
FIG. 5A is a schematic diagram of the three-dimensional display device according to the embodiments of the disclosure displaying in the landscape mode.

As illustrated in FIG. 5A, when the three-dimensional display direction is the horizontal direction X, the control element controls the micro LED display panel 101 to display in the landscape mode, and also controls the respective longitudinal strip-shaped electrodes 2042, and the planar electrode 2043, in the light control component to generate a positive voltage difference between them, to thereby control the liquid crystal or electrochromic material in the light adjusting layer to be deflected to generate a parallax barrier including longitudinal light-shielding strips and longitudinal light-transmitting strips so as to display a three-dimensional image in the landscape mode.

Figure 5B:
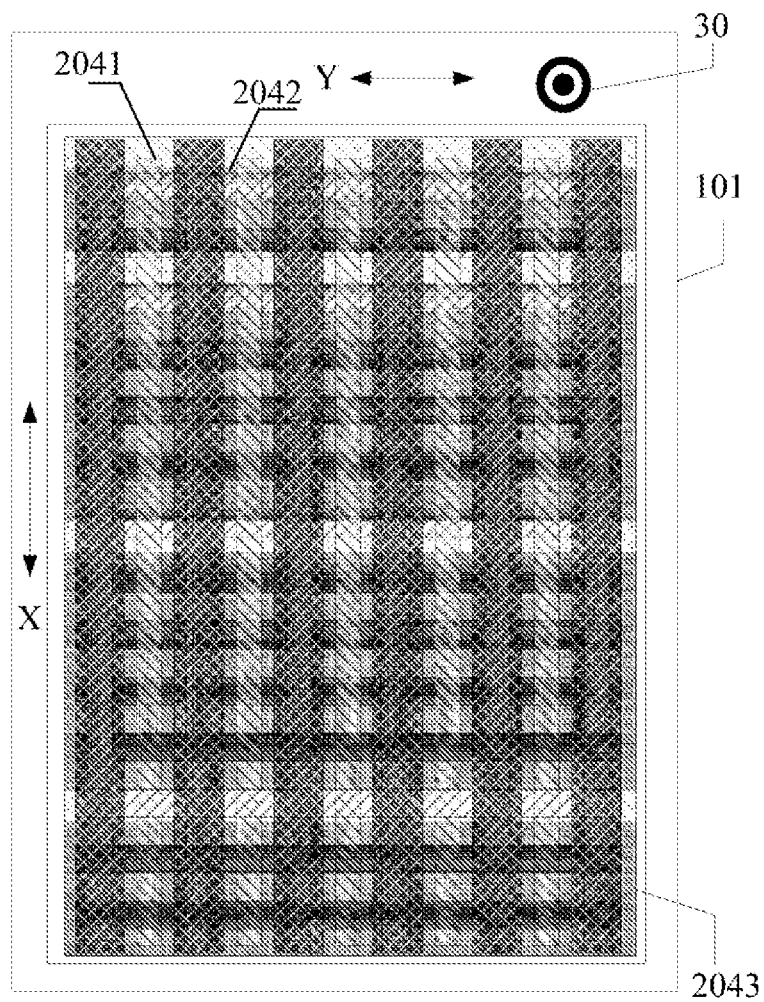
FIG. 5B is a schematic diagram of the three-dimensional display device according to the embodiments of the disclosure displaying in a portrait mode.

As illustrated in FIG. 5B, when the three-dimensional display direction is the vertical direction Y, the control element controls the micro LED display panel 101 to display in the portrait mode, and also controls the respective transverse strip-shaped electrodes 2041, and the planar electrode 2043, in the light control component to generate a positive voltage difference between them, to thereby control the liquid crystal or electrochromic material in the light adjusting layer to be deflected to generate a parallax barrier including traverse light-shielding strips and traverse light-transmitting strips so as to display a three-dimensional image in the portrait mode.

Optionally while a three-dimensional image is being displayed, in the three-dimensional display device above according to the embodiments of the disclosure, each of the light-shielding strips and each of the light-transmitting strips in the parallax barrier correspond respectively to at least one column or row of pixels in the micro LED display panel 101. Stated otherwise, when the light-shielding strips and the light-transmitting strips are transverse strips, each transverse strip corresponds to at least one row of pixels arranged in the transverse direction on the micro LED display panel 101, and when the light-shielding strips and the light-transmitting strips are longitudinal strips, each longitudinal strip corresponds to at least one column of pixels arranged in the longitudinal direction on the micro LED display panel 101.

Optionally in order to achieve a better three-dimensional display effect, each of the light-shielding strips and each of the light-transmitting strips in the parallax barrier correspond respectively to one column or row of pixels in the micro LED display panel 101.

Particularly in the three-dimensional display device above according to the embodiments of the disclosure, as illustrated in FIG. 3, a width $W_b$ of each of the light-shielding strips in the parallax barrier is the same as a width $W_w$ of each of the light-transmitting strips in the parallax barrier, and their widths are approximately hundreds of micrometers. Optionally the width $W_b$ of each of the light-shielding strips, and the width $W_w$ of each of the light-transmitting strips in the parallax barrier are equal to a size $W_p$ of a pixel, i.e., $W_b=W_w=W_p$.

Figure 6:
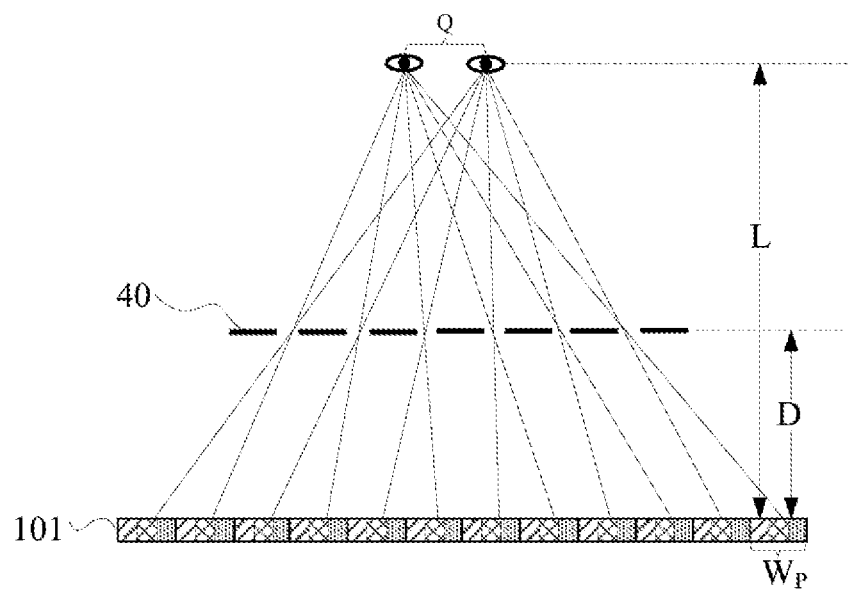
FIG. 6 is a schematic diagram of the three-dimensional display device according to the embodiments of the disclosure displaying in a three-dimensional mode.

Moreover as illustrated in FIG. 6, there is a following relationship between a distance D between the micro LED display panel 101, and the parallax barrier 40 generated by the light control component 102, and the size $W_p$ of the pixel: $D=W_p*L/(Q+W_p)$.

Where L is a distance between a position of eyes of the viewer, and the micro LED display panel 101, and Q is a spacing between points of view of the viewer, i.e., a distance between pupils of the eyes of the viewer.

For example, it is assumed that there is a visual distance of 30 cm of the three-dimensional display device, that is, L=30 cm, and a value of D is approximately 1 cm, so the value of D is approximately one hundred times as large as a value of $W_w$.

Furthermore an experiment showed in the three-dimensional display device above according to the embodiments of the disclosure, desirable brightness can be achieved when the ratio of an area occupied by micro LED pixels to a total area of a display area is 1/100.

The three-dimensional display device above according to the embodiments of the disclosure includes: a micro LED display panel, a light control component arranged at a light-emitting side of the micro LED display panel, and a control component electrically connected respectively with the micro LED display panel and the light control component, where the control component is configured to control the micro LED display panel to display, and to control the light control component to generate a parallax barrier matching with the micro LED display panel, in a three-dimensional display mode, where the parallax barrier includes light-shielding strips, and light-transmitting strips, which are arranged alternately. Since the control component can control the light control component to generate the parallax barrier matching with the micro LED display panel, while controlling the micro LED display panel to display, when light rays emitted by the micro LED display panel pass through the parallax barrier, a three-dimensional image can be displayed, so that a three-dimensional display can be achieved on the micro LED display panel.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A three-dimensional display device, comprising: a micro LED (Light-Emitting Diode) display panel, a light control component arranged at a light-emitting side of the micro LED display panel, and a control component electrically connected with the micro LED display panel and the light control component respectively, wherein:

the control component is configured to control the micro LED display panel to display, and to control the light control component to generate a parallax barrier matching with the micro LED display panel, in a three-dimensional display mode, wherein the parallax barrier comprises light-shielding strips, and light-transmitting strips, which are arranged alternately;

wherein the control component is configured to control the micro LED display panel to display in a landscape mode or in a portrait mode, according to a detected relative positional relationship of a viewer to the micro LED display panel, and to control the light control component to generate a parallax barrier matching with the landscape mode or the portrait mode, in the three-dimensional display mode;

wherein the light control component comprises: a first substrate and a second substrate arranged opposite to each other, an electrode structure arranged between the first substrate and the second substrate, and a light adjusting layer configured to generate the parallax barrier according to voltage variation of the electrode structure;

wherein the electrode structure comprises:

a plurality of transverse strip-shaped electrodes, and a plurality of longitudinal strip-shaped electrodes, which are arranged on a side of the first substrate facing the second substrate, and which intersect in different planes with, and are insulated from each other, and a planar electrode arranged on a side of the second substrate facing the first substrate;

wherein a width of each of the light-shielding strips and a width of each of the light-transmitting strips in the parallax barrier are equal to a size Wp of a pixel, and a relationship between a distance D between the micro LED display panel and the parallax barrier generated by the light control component, and the size Wp of the pixel comprises:

$$D=W_p*L/(Q+W_p)$$

wherein D is a distance between the micro LED display panel and the parallax barrier generated by the light control component, Wp is a size of the pixel, L is a distance between a position of eyes of the viewer and the micro LED display panel, and Q is a spacing between points of view of the viewer.

2. The three-dimensional display device according to claim 1, wherein a material of the light adjusting layer is a liquid crystal material or an electrochromic material.

3. The three-dimensional display device according to claim 2, wherein a material of the light adjusting layer is a liquid crystal material; and the light control component further comprises a plurality of transparent spacers arranged between the first substrate and the second substrate.

4. The three-dimensional display device according to claim 1, wherein the first substrate is located between the second substrate and the micro LED display panel; or the second substrate is located between the first substrate and the micro LED display panel.

5. The three-dimensional display device according to claim 1, wherein the light control component further comprises an insulation layer arranged between respective longitudinal strip-shaped electrodes and respective longitudinal strip-shaped electrodes.

6. The three-dimensional display device according to claim 1, wherein the control component comprises a capture element and a control element, wherein:

the capture element is configured to determine a relative position of a line of sight of the viewer to the micro LED display panel, or to determine a gravity sensing direction of the three-dimensional display device; and the control element is configured to determine a three-dimensional display direction required of the three-dimensional display device according to the determined relative position of the line of sight of the viewer to the micro LED display panel, or the determined gravity sensing direction of the three-dimensional display device, and thereafter to control the micro LED display panel to display in the landscape mode or in the portrait mode, and also to control the light control component to generate the parallax barrier matching with the landscape mode or the portrait mode.

7. The three-dimensional display device according to claim 6, wherein the capture element is a camera or a gravity sensor.

8. The three-dimensional display device according to claim 1, wherein each of the light-shielding strips and each of the light-transmitting strips in the parallax barrier correspond respectively to one column or row of pixels in the micro LED display panel.

9. The three-dimensional display device according to claim 1, wherein a width of each of the light-shielding strips in the parallax barrier is same as a width of each of the light-transmitting strips in the parallax barrier.

10. The three-dimensional display device according to claim 1, wherein the three-dimensional display device further comprises a transparent glue layer arranged between the micro LED display panel and the light control component.

11. The three-dimensional display device according to claim 1, wherein the light control component comprises: a first substrate and a second substrate arranged opposite to each other, an electrode structure arranged between the first substrate and the second substrate, and a light adjusting layer configured to generate the parallax barrier according to voltage variation of the electrode structure.

12. The three-dimensional display device according to claim 11, wherein a material of the light adjusting layer is a liquid crystal material or an electrochromic material.

13. The three-dimensional display device according to claim 11, wherein the electrode structure comprises:

a plurality of transverse strip-shaped electrodes, and a plurality of longitudinal strip-shaped electrodes, which are arranged on a side of the first substrate facing the second substrate, and which intersect in different planes with, and are insulated from each other, and a planar electrode arranged on a side of the second substrate facing the first substrate.

14. The three-dimensional display device according to claim 1, wherein each of the light-shielding strips and each of the light-transmitting strips in the parallax barrier correspond respectively to one column or row of pixels in the micro LED display panel.

15. The three-dimensional display device according to claim 1, wherein a width of each of the light-shielding strips in the parallax barrier is same as a width of each of the light-transmitting strips in the parallax barrier.

16. The three-dimensional display device according to claim 1, wherein the three-dimensional display device further comprises a transparent glue layer arranged between the micro LED display panel and the light control component.

\* \* \* \* \*